Dec. 9, 1958
A. R. GOLRICK
2,863,333
SHIPPER OPERATING MECHANISMS FOR THREE
SPEED BICYCLE TRANSMISSIONS
Filed June 8, 1953
5 Sheets-Sheet 1
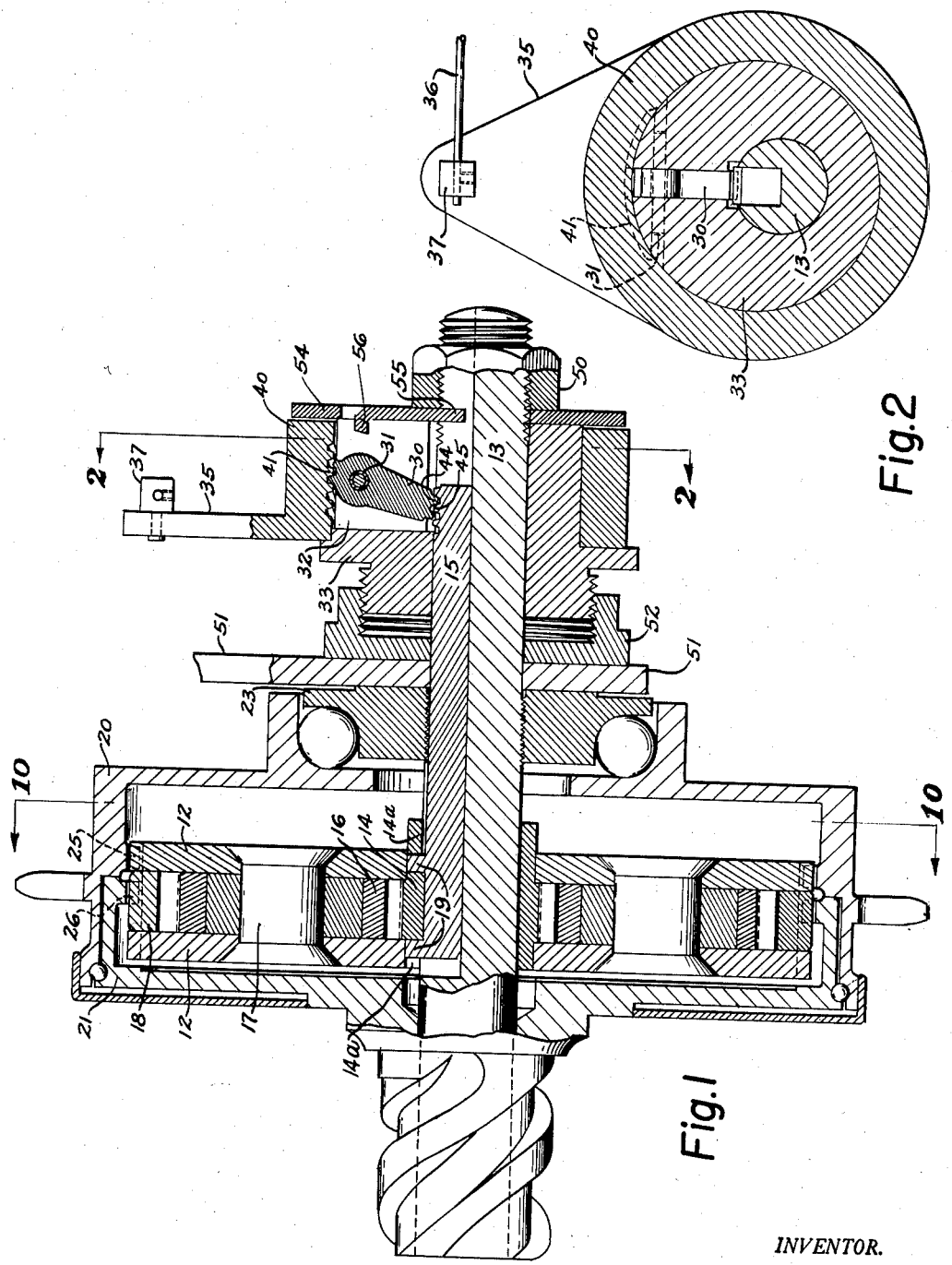
INVENTOR.
ALBERT R. GOLRICK

INVENTOR.

ALBERT R. GOLRICK

Dec. 9, 1958 A. R. GOLRICK 2,863,333
SHIPPER OPERATING MECHANISMS FOR THREE
SPEED BICYCLE TRANSMISSIONS
Filed June 8, 1953 5 Sheets-Sheet 3

INVENTOR.

ALBERT R. GOLRICK

INVENTOR.
ALBERT R. GOLRICK

United States Patent Office 2,863,333
Patented Dec. 9, 1958

2,863,333

SHIPPER OPERATING MECHANISMS FOR THREE SPEED BICYCLE TRANSMISSIONS

Albert R. Golrick, Cleveland Heights, Ohio, assignor to The Murray-Ohio Manufacturing Company, Cleveland, Ohio, a corporation of Ohio Application June 8, 1953, Serial No. 360,177

6 Claims. (Cl. 74—750)

The present invention relates to gear changing mechanism for velocipede or bicycle three speed transmissions and more particularly to the operating means for selectively setting the gears of the mechanism.

A variety of forms of change speed gearing for bicycles have been proposed and a number of them adapted wherein the selection of the desired gear setting is accomplished by a pull cord or cable operating a key or gear element in one direction axially of the shaft, while shifting in the opposite axial direction is usually accomplished by use of a spring arranged to yieldingly oppose the cable pull.

It is an object of the present invention to provide a shipper operating means which can be actuated manually to effect operation of the shipper means in both directions and thereby eliminate the need of spring operation.

A further object of the present invention is the provision of a shipper operating means for a bicycle speed change mechanism which may be mounted upon the bicycle axle in a simple manner while serving as a motion multiplying means whereby a rockable lever manually operated through a flexible rod can be utilized to operate the shifting means.

A still further object of the present invention is to provide an arrangement of associated elments with the motion multiplying means in such manner that the entire shipper operating means may be mounted on the rear axle of a bicycle in a stable manner.

Other objects of the present invention will appear in the following description referring to the accompanying drawings illustrating a preferred form thereof. The essentially novel features are summarized in the attached claims.

In the drawings:

Fig. 1 is a cross sectional elevation of a bicycle transmission of the type referred to and showing one form of my shipper mechanism combined therewith;

Fig. 2 is a cross sectional view of the shipper actuating mechanism taken on a plane extending transverse to the axle center line;

Figure 3:
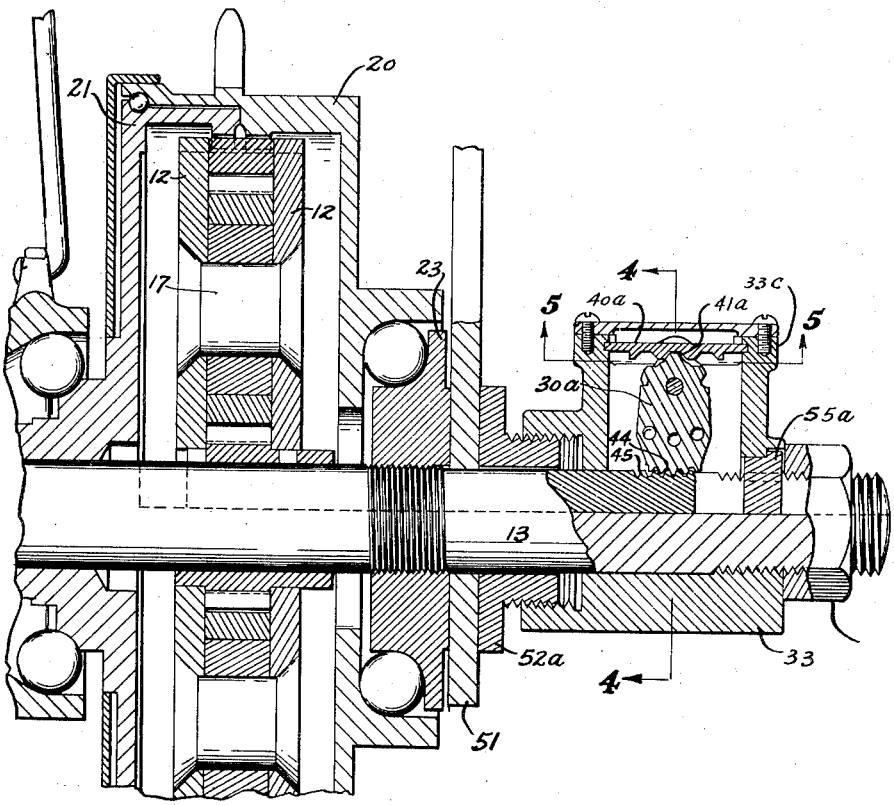
Fig. 3 shows in a cross section similar to Fig. 1, a modified form of the actuating means having a slide member with a rack formation in place of a lever hub with helical gear teeth.
Figure 4:
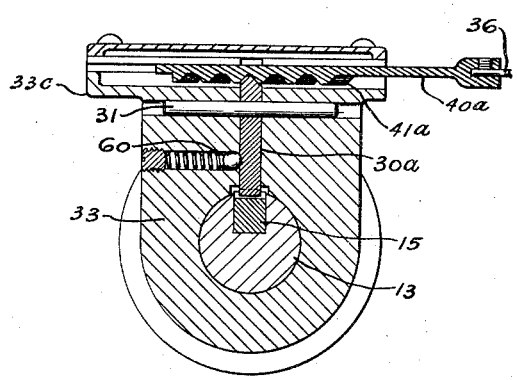
Figure 5:
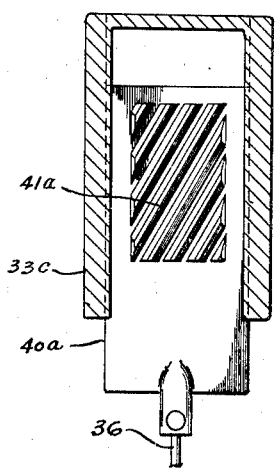
Figure 6:
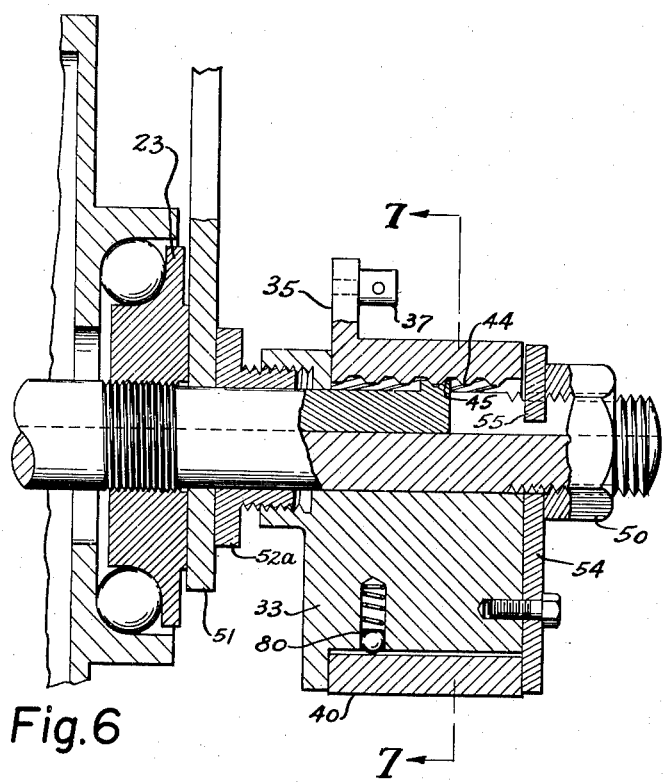
Figure 7:
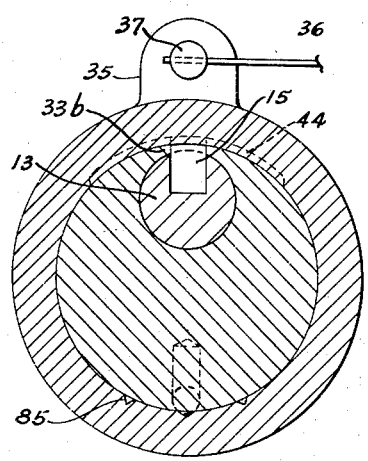
Figure 8:
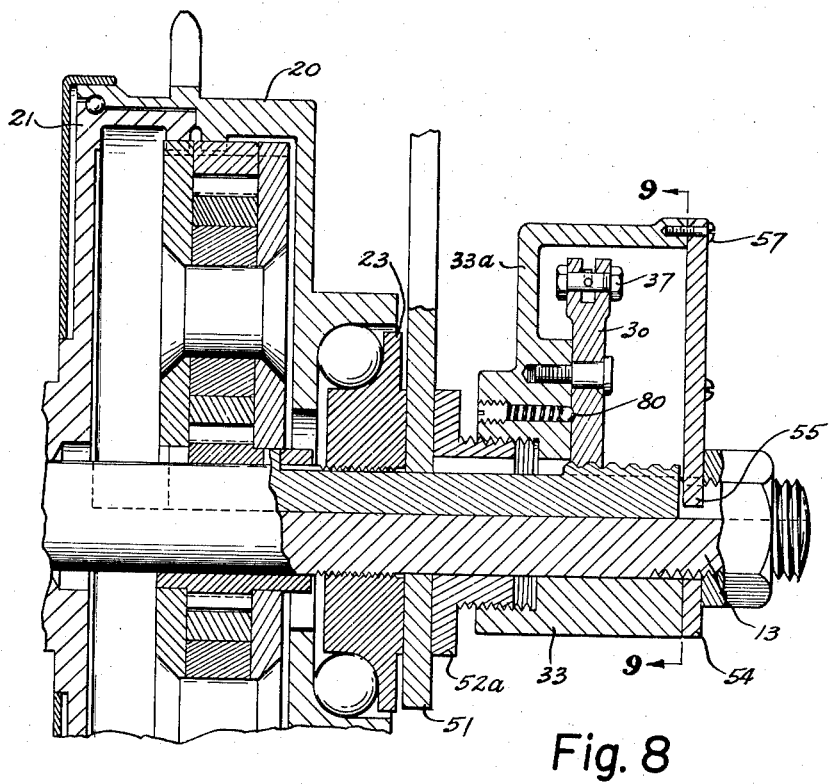
Figure 9:
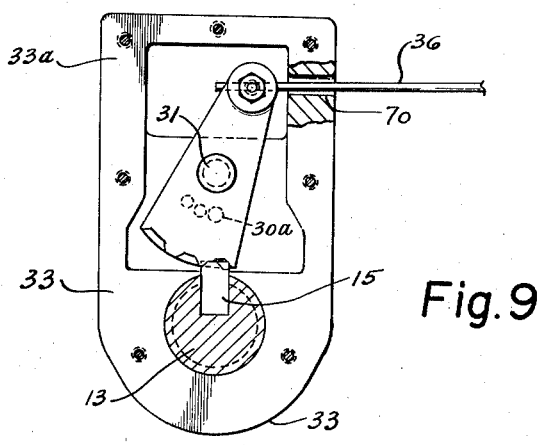
Figure 10:
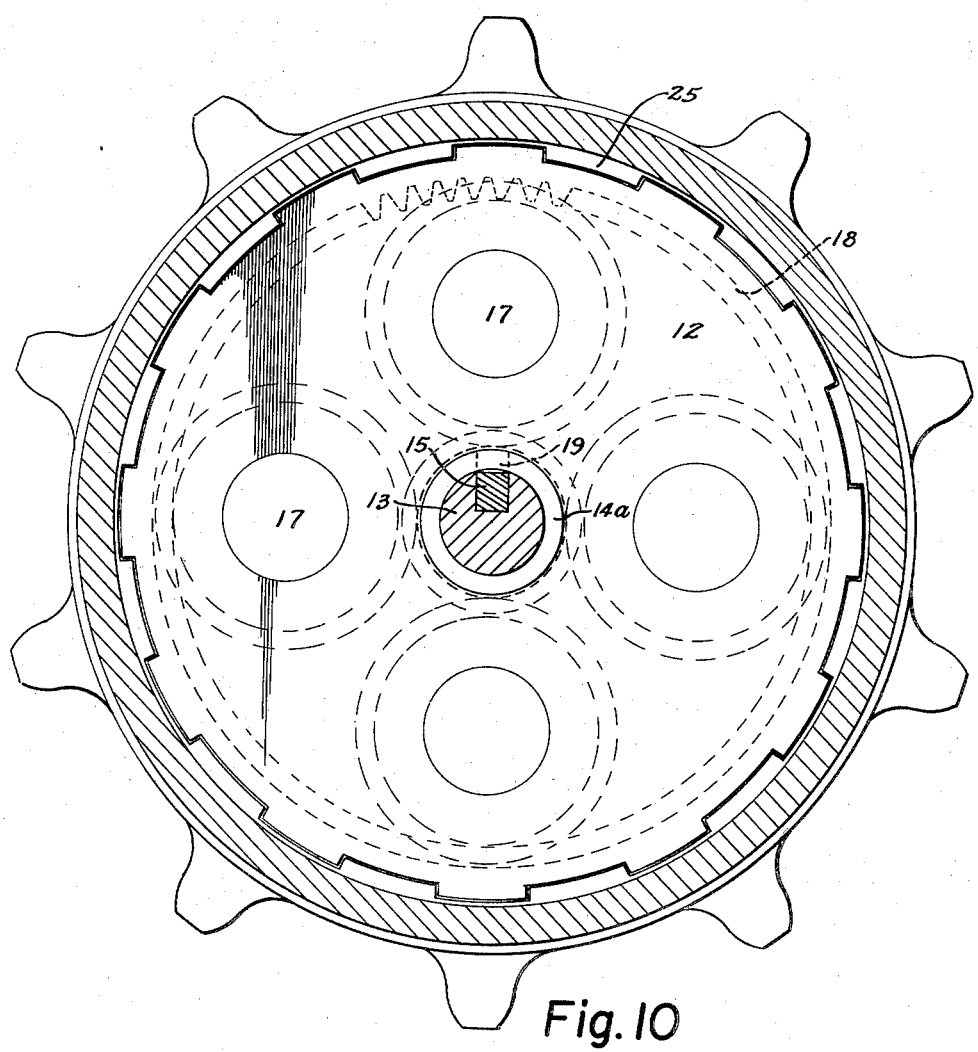

Figs. 4 and 5 are cross sectional views taken along planes indicated by the lines 4—4 and 5—5 respectively of Fig. 3;

Figs. 6 and 7 show a modification of the Fig. 1 mechanism in that the multiplying lever is omitted and the lever center is disposed eccentric to the axle center whereby the internal helical gear teeth may be brought into mesh with a helical tooth rack on the shipper key; and Figs. 8 and 9 show a shipper operating mechanism wherein the axis of the motion multiplying lever is disposed parallel to the axle center line and the outer end of the lever is connected directly to the push and pull rod; and Fig. 10 is a cross sectional view taken along the line 10—10 of Fig. 1 and showing the clutching or coupling splines between the planetary system and the driving member.

Various forms of bicycle speed change transmission have been produced heretofore wherein the gear selection was effected by an axially shiftable member, usually disposed within a central bore formed in the bicycle rear axle supporting the transmission. A compression spring served to maintain the shipper in one extreme position and a chain and pull cable extending to the fore part of the bicycle was manually operated to pull the shipper member against the resistance of the spring to move the shipper to other selected positions. Cable stretching, spring tension variation and other difficulties with such transmissions necessitated frequent servicing and adjusting. The simplest form of operating means for axial shippers would be a rocking arm with a camming hub acting on the shipper directly and positively. However, it will be found, and particularly in three speed transmissions, that the extent of axial shipper movement required is considerably in excess of that obtainable by a direct camming action of the lever upon the shipper since the rocking movement required, if the cam angle is to remain within operative limits, cannot be effected by a push and pull flexible rod. Accordingly, I have devised a motion multiplying means interposed between the rocking lever and the shipper which will effect more than sufficient axial movement of the shipper with a rocking movement of the rod operated lever of not more than 60°.

In Fig. 1 I show a three speed transmission of the shiftable planetary cage type. The shiftable unit comprises cage plates 12 with a sun gear 14, planet gears 16 and ring gear 18 disposed there between. The studs 17 supporting the planet gears 16 serve as shouldered spacer members connecting the plates. The sun gear 14 is axially slidable with the cage structure on the bicycle axle 13 and is restrained from rotation by a shiftable key member 15 sliding in a key way formed in the axle 13. At each side of the sun gear are lugs 19 formed on the key which engage the sides of the sun gear below the bottoms of the sun gear teeth. Thus when the key is shifted along the key way, the lugs shift the sun gear and the sun gear carries the cage with it. It will be noted that the cage is rotatably mounted upon sleeve extensions 14a of the sun gear which are thicker in cross section than the height of the shipper lugs 19. The cage is disposed within oppositely facing cup shaped driving member 20 and driven member 21, the latter member being connected to a coaster brake mechanism not shown. The driving member 20 is supported by a bearing member 23 fixed on the axle 13 and the shipper key 15 extends outwardly through the bearing member 23.

The clutching of the several transmission elements to obtain a direct drive, a low speed and a high speed is effected at the perimeters of the cage plates 12 and the ring gear 18 in slots formed therein in which engage the lugs 25 on driving member 20 and lugs 26 on driven member 21.

When the cage is shifted to the extreme left as viewed in Fig. 1, the connection is for overdrive with the driving member driving the cage and the ring gear driving the driven member. When the cage is shifted to the extreme right an underdrive is obtained with the driving member 20 driving the ring gear and the cage driving the driven member 21. When the cage is at center position the lugs 25 and 26 are connected to the ring gear and all rotating members rotate in unison.

From the above description it is apparent that the width of the cage structure determines the extent of axial shift required for the two extreme settings. The predetermined torque transmitting effort to be provided for in the gear design determines the width of the cage.

In a shipper operating mechanism the minimum axial shifting capacity will be at least one quarter of an inch and some excess movement should be provided. I find that by introducing a motion multiplying lever between the manually operated lever and the shipper member which is in the form of a helical gear at the short end and has a spur or helical gear formation at the long end, an excess of desired axial movement of the shipper member may be obtained with a limited rocking movement of the manually operated lever. Thus in the drawings, I show a lever gear 30 pivotally supported on a pin 31 in an axially extending slot 32 formed in a fixed barrel member 33 eccentrically mounted upon and keyed to the axle 13. The barrel member 33 comprises a journal support for the manually operated lever member 35. The rockable lever member 35 has a flexible operating rod 36 attached to its outer end by a pivotally connected block 37. The rod 36 extends to the forward part of the bicycle where it is attached to a selector lever associated with a bracket and indicator plate or detent.

The internal bearing surface of the hub 40 of the lever 35 is provided with gear teeth or camming surfaces 41 which engage the short end of the lever gear 30, the connection between the rocker lever hub 40 and lever gear being that of a helical gear tooth formation with about a 30° helix formation. The longer end of the lever gear 30 is provided with spur or helical gear teeth 44 meshing with a rack formation 45 on the outer end of the shipper key 15. Thus a rocking motion of the manually operated lever 35 in a plane normal to the rear axle 13 results in an axial movement of the shipper member.

The slotted barrel member serves also as a clamping sleeve to transmit the tightening force of the axle nut 50 to the rear frame forks 51. An adjusting nut 52 is provided on the inner end of the barrel member whereby relative axial adjustment between the transmission mechanism per se and the pivotal center of the lever gear 30 is attainable to meet variations in the frame construction and to have the direct drive (central) position of the lever gear correspond with the direct drive position of the manually operated rocker lever 35.

To maintain the barrel member with its lever gear slot in proper alignment with the axle key way and shipper member slidable therein, the barrel member is keyed to the axle by a washer member 54 of sufficient outer diameter to maintain the rocker lever hub on the barrel. This washer member has a key nib 55 formed in the axle bore thereof to fit the axle key way, and a radially disposed nib 56 snug fitted into the end of the lever slot of the barrel.

By having the axle bore formed in the barrel member eccentrically relative to its external lever journal diameter, sufficient space for a lever gear of proper design will be afforded without increasing the over all bulk and weight of the shipper operating mechanism.

If desired, a detent for maintaining the shipper key in any one of the three selectable positions may be provided by use of a ball detent retained in a suitable bore formed in the barrel to bear upon a side face of the lever gear 30 or upon the bearing surface of the rocker lever hub or vice versa. By use of the adjusting nut, the detented positions of the lever can be brought into conformity with the required positions of the shipper key.

It will be noted that the elements of the manually operated shipper actuating means can be of a rugged design without entailing bulk and excessive weight on the rear axle of the bicycle. Also, by reason of the motion multiplying lever 30, the rocking arc of motion of the rod operated lever is confined to a movement well within the arc of operation of a flexible push and pull rod whereby all gear selection is effected in a positive manner, thus eliminating the use of springs.

In Figs. 3, 4, and 5 I show a modification of the motion translating means which may comprise a body member 33 keyed at 55a to the axle 13. The upper part 33c of the body member may comprise a slideway formation extending in a plane parallel to the axle centerline. A slide member 40a is supported in the body slideway with a rack formation 41a disposed to mesh with the upper teeth of the lever gear 30a. The shipper key rack structure meshes with the lower end of the lever gear 30a in the manner hereinbefore described. In this form, the lever gear 30a may be pivotally mounted in the body slot with a one to one ratio of movement of the lever gear ends. An adjusting nut 52a fitting on the axle and threaded into the body member affords adjustment between the end of the shipper key member and the lever gear as hereinbefore described.

In this second form, the axle key way may be disposed rearwardly of the position shown to turn the slide and slideway to extend in the direction of the push and pull rod. Should the helix angle of the slide rack be 45° and the lever gear teeth be designed to rotatively match the rack, a movement of one quarter inch of the slide will effect a like movement of the shipper key. In this form a detent ball spring urged against the lever gear or against the slide may be supported by the body member 33 in suitable location and manner. I have shown such a detent ball bearing against the lever gear at 60.

However, the push and pull effort can be reduced by using a 30° helix relationship, in which event the lever gear 30a would have a motion multiplying ratio thereby to confine the required slide movement to less than one inch.

In Figs. 8 and 9 I show a shipper operating mechanism wherein the lever gear is pivotally supported within a casing formation of the supporting bracket to rock about an axis extending parallel to the direction of shipper key motion and to the axial center line of the bicycle axle. In this form one end of the lever gear is connected directly to the manually operated push and pull rod.

To obtain the motion translation, the gear end of the lever 30 is provided with helical teeth having a helix angle of about 30° to mesh with the corresponding helical rack teeth 45 formed on the outer end portion of the shipper key 15. The bracket or supporting member 33 is provided with the axially adjustable nut 52a for the purposes hereinbefore stated and the clamping nut 50 serves to hold the member 33 in clamped relation to the rear fork prongs 51. As will be noted, the upper part of the bracket member 33 may have a casing formation 33a closed by a washer plate 54 keyed by nib 55 to the axle 13. The plate is secured to the casing in any suitable manner such as screws 57. The upper end of the lever gear 30 has a bifurcated structure bored to receive a pivot barrel 37 to which the manually operated push and pull rod 36 is suitably connected. The rod 36 extends through a guide formation 70 which may be integrally formed as part of the casing wall as shown or it may comprise a threaded thimble attached to the casing wall. The center of the lever pivot pin 31 may be located relative to the operating ends of the lever gear as to increase or decrease the rod motion, or this lever ratio may be one to one as desired. A detent ball 80 may bear upon the side face of the lever gear 30 and be disposed in a cavity formed in the member 33 as shown, the lever 30 having three detent recesses 30a spaced to correspond to the three selective gear change settings of the shipper key. In assembling the bicycle transmission the axle is turned to a position which will permit the rod 36 to enter the casing without undue flexing. The advantage of this arrangement is that all of the operating parts can be protected from the ingress of grit and dirt, while the desired translated motion of the shipper key can be obtained without unduly loading the push and pull rod and with a rocker motion of the lever not in excess of 50°.

In Figs. 6 and 7 I show a shipper operating mechanism constituting a modification of the mechanism shown in Fig. 1 in that the internal helical gear formation of the lever is arranged to act directly upon a corresponding rack formation on the outer end portion of the shipper key. To effect this arrangement while retaining the axial adjustability of the supporting bracket or barrel, I position the rack formation of the key radially outwardly of the key whereby the barrel or lever bearing member may have some metal present longitudinally of and adjacent to the keyway of the axle. The remainder of the lever supporting member is formed eccentrically to the center line of the axle.

In Fig. 6 the bracket or barrel member 33 is adapted to be fixed to the bicycle axle 13 by a clamping washer 54 which has a key nib 55 fitting the axle keyway. The washer member may be keyed or fixed to the bracket member by any suitable means such as a bolt 90. The eccentric formation of the member 33 is such that some metal indicated by the reference numeral 33b is present between the axle bore and the lever bearing surface of the member 33. The hub 40 of the lever member 35 is provided with an internal helical gear formation 44 which meshes with a corresponding rack formation 45 on the outer end portion of the shipper key 15. The bracket member 33 is flanged at its inner end and the washer member 54 circumferentially corresponds to the bracket flange so that the lever hub is rockable upon the eccentric member 33 while being retained between these two flange formations. The lever member 35 and its integral hub 40 are rocked by the push and pull rod 36 pivotally attached at 37 to the lever. A detent means comprising the spring urged ball 80 may be disposed in a radially extending opening formed in the bracket bearing member 33; and three axially extending notches 85, spaced to correspond to the three selective positions of the shipper key 15, may be formed in the bearing face of the lever hub 40. The helical gear formation may be about 30° for satisfactory motion translation from rod to key. In this construction axial adjustment of the member 33 relative to the key position may be obtained as hereinbefore disclosed. The clamping nut 50 acts upon the members 54 and 33 to clamp these members to the prongs of the rear fork 51 of the bicycle frame; and by providing the metal 33b in the structure of the member 33, this clamping force is exerted in a balanced manner despite the eccentric construction of the member 33 relative to the axle center. In this form of construction the extent of rocking motion required of the lever 35 may be considerably reduced.

In all of the shipper operating mechanisms herein disclosed no springs, other than a detent spring, are required either in the shipper operating mechanism or in the transmission mechanism per se. The required extent of axial motion translated from a push and pull motion in a plane generally normal to the center line of the axle is accomplished in a compact mechanism amenable to good production design. The helical gear angles herein mentioned are 30° with reference to a plane normal to the centerline of the axle.

I claim:

1. In a bicycle transmission of the planetary gear type having a shiftable gear cage supported on a bicycle axle, a non-rotating shipper means supported by the axle and operatively connected to the cage to shift the cage while permitting rotation of the cage: a shipper operating means comprising a rockable lever having a hub eccentrically surrounding and mounted on the axle with its rocking center line parallel to the axle and the non-rotating shipper means, and a motion multiplying means operatively disposed between the lever hub and the shipper means for axially shifting the shipper means and gear cage when the lever is rocked.

2. In a planetary gear transmission means for a bicycle wherein the speed changes are effected by action of a non-rotating shipper means extending axially of the bicycle axle, a shipper operating means comprising a manually operated lever having a hub extending about the axle, an internal helical gear formation on the lever hub, a supporting member for the lever hub adapted to be fixed to the bicycle axle with the shipper means meshing with the helical gear formation of the hub and said supporting means supporting the lever hub in eccentric relation to the axle.

3. In a bicycle transmission having a shiftable planetary gear carrier supported on the bicycle axle, a non-rotating shipper means shiftable along the axle and operatively connected to the carrier to shift the carrier while permitting rotation of the carrier: a shipper operating means comprising a rockable internal helical gear eccentrically surrounding the axle and the non-rotating shipper means with the rockable axis of the gear extending parallel to the axis, a rack formation on the shipper means meshing with the rockable internal helical gear and a supporting means fixed to the axle and supporting the helical gear.

4. In a bicycle transmission having a shiftable planetary gear carrier supported on the bicycle axle, a non-rotating shipper means shiftable along the axle and operatively connected to the carrier to shift the carrier while permitting rotation of the carrier: a shipper operating means comprising a rockable push and pull rod operated member eccentrically extending about the axle with its rocking axis extending parallel to the axle, a bracket adjustably fixed to the axle and supporting said member, motion translating means connecting said push and pull rod operated member to said non-rotating shipper means and means adjustably locating the bracket axially on the axle thereby to pre-determine the shifted positions of the carrier along the axle.

5. In a bicycle having a frame including two rear fork prongs, a rear axle supported by said prongs, a three speed planetary transmission on the rear axle of the bicycle disposed between the rear fork prongs of the bicycle frame on bearings clamped to the fork prongs and a transmission shipper means on the axle disposed exteriorly of the prongs: an actuating means for selectively operating the shipper means of the three speed bicycle transmission comprising a non-rotatable spacer member eccentrically mounted on the rear axle between a rear fork prong and a binding nut on the axle of the bicycle, a washer member keyed to the axle and to said mounted member, a binding nut clamping said washer to the mounted member and the mounted member to the bicycle frame, means disposed between said prong and the mounted member and in threaded engagement with the mounted member for varying the axial length thereof and motion translating means supported by the mounted member, including a member operable by a push and pull rod for imparting axial movement to the shipper means.

6. In a bicycle having a frame including two rear fork prongs, a rear axle supported by said prongs, a three speed planetary transmission on the rear axle of the bicycle disposed between the rear fork prongs of the bicycle on bearings clamped to the fork prongs, and transmission shipper means on the axle disposed exteriorly of the bicycle prongs: an actuating means for selectively operating the shipper means comprising a non-rotatable spacer member mounted upon and keyed to the axle, a binding nut clamping the mounted member to one of the said rear prongs, means in threaded engagement with the mounted member for varying the effective length of the mounted member and motion translating means supported by the mounted member in eccentric relation to the axle including a rockable member and a push and pull rod for rocking said last named member.

References Cited in the file of this patent

UNITED STATES PATENTS

| 584,635 | Hart | June 15, 1897 |
| 863,422 | Newton | Aug. 13, 1907 |
| 2,180,527 | Jones | Nov. 21, 1939 |
| 2,593,747 | Godfrey | Apr. 22, 1952 |

FOREIGN PATENTS

| 168,446 | Austria | June 11, 1951 |